(12) United States Patent
Wang

(10) Patent No.: US 11,036,072 B2
(45) Date of Patent: Jun. 15, 2021

(54) LIQUID CRYSTAL DISPLAY PANEL

(71) Applicant: TCL CHINA STAR OPTOELECTRONICS TECHNOLOGY CO., LTD., Shenzhen (CN)

(72) Inventor: Nianmao Wang, Shenzhen (CN)

( * ) Notice: Subject to any disclaimer, the term of this patent is extended or adjusted under 35 U.S.C. 154(b) by 0 days.

(21) Appl. No.: 16/627,296

(22) PCT Filed: Nov. 13, 2019

(86) PCT No.: PCT/CN2019/117994
§ 371 (c)(1),
(2) Date: Dec. 29, 2019

(87) PCT Pub. No.: WO2021/027154
PCT Pub. Date: Feb. 18, 2021

(65) Prior Publication Data
US 2021/0124207 A1   Apr. 29, 2021

(30) Foreign Application Priority Data
Aug. 15, 2019 (CN) .......................... 201910753107.6

(51) Int. Cl.
*G02F 1/1333* (2006.01)
*G02F 1/13357* (2006.01)

(52) U.S. Cl.
CPC .. *G02F 1/133308* (2013.01); *G02F 1/133608* (2013.01); *G02F 2201/46* (2013.01)

(58) Field of Classification Search
None
See application file for complete search history.

(56) References Cited

U.S. PATENT DOCUMENTS

| | | | | |
|---|---|---|---|---|
| 2005/0151894 A1* | 7/2005 | Katsuda | ............ | G02F 1/133608 349/58 |
| 2008/0253858 A1* | 10/2008 | Hsieh | ...................... | F16B 31/02 411/14 |
| 2012/0081631 A1 | 4/2012 | He et al. | | |
| 2018/0195547 A1* | 7/2018 | Demeocq | ................ | F16B 31/02 |

FOREIGN PATENT DOCUMENTS

| | | |
|---|---|---|
| CN | 101872082 A | 10/2010 |
| CN | 205384423 U | 7/2016 |
| CN | 205670357 U | 11/2016 |
| JP | 2006030331 A | 2/2006 |
| JP | 2007264202 A | 10/2007 |
| JP | 2018163308 A | 10/2018 |
| WO | 2012042798 A1 | 4/2012 |

\* cited by examiner

*Primary Examiner* — Phu Vu

(57) ABSTRACT

The present application provides a liquid crystal display comprising a display panel, a backlight module, and a plurality of connecting screws. Wherein, the display panel and the backlight module have a plurality of correspondingly arranged threaded holes, and the plurality of connecting screws cooperate with the plurality of threaded holes to fix the display panel and the backlight module together.

9 Claims, 2 Drawing Sheets

LIQUID CRYSTAL DISPLAY PANEL

CROSS REFERENCE TO RELATED APPLICATION

This application claims the priority of International Application No. PCT/CN2019/117994, filed on Nov. 13, 2019, which claims priority to Chinese Application No. 201910753107.6, filed on Aug. 15, 2019. The entire disclosures of each of the above applications are incorporated herein by reference.

BACKGROUND OF INVENTION

Field of Invention

The present invention relates to the field of electronic display, and in particular, to a liquid crystal display (LCD) panel.

Description of Prior Art

In liquid crystal displays (LCDs), a backlight module of a display is usually bonded to a display panel with a light-shielding tape. The light-shielding tape includes a substrate and a binder, and the commonly used substrate includes a polyethylene terephthalate (PET), and the binder includes an acrylic binder.

Technical Problems

Referring to FIG. 1 and FIG. 2, when a display panel and a backlight module are bonded by a light-shielding tape, in order to ensure reliability of the bonding, the light-shielding tape needs to cover all frames of the display panel, and the cost is relatively high. Further, with a number of usages increasing and temperatures rising, a viscosity of acrylic adhesive decreases, resulting in a decrease in adhesive ability of the light-shielding tape, which pose a risk of the display panel and the backlight module separating.

Therefore, there is a need to improve the backlight module of the existing display panel and the fixing method of the display panel.

SUMMARY OF INVENTION

The present application provides a liquid crystal display to optimize the backlight module of the display screen and a fixing method of the display panel.

The application provides a liquid crystal display comprising a display panel, a backlight module and a plurality of connecting screws;

wherein the display panel and the backlight module have a plurality of correspondingly arranged threaded holes, and the plurality of connecting screws cooperate with the plurality of threaded holes to fix the display panel and the backlight module together.

According to one aspect of the application, wherein each of the threaded holes comprises:

a first threaded hole disposed on the display panel;

a second threaded hole disposed on the backlight structure;

wherein the first threaded hole and the second threaded hole overlap when the display panel and the backlight module are combined.

According to one aspect of the application, wherein the liquid crystal display further comprises a cushioning pad located between the liquid crystal panel and the backlight module;

wherein each threaded hole further comprises a third threaded hole disposed on the cushioning pad;

wherein the first threaded hole, the second threaded hole, and the third threaded hole overlap when the display panel and the backlight module are combined.

According to one aspect of the application, wherein a material forming the cushioning pad is a flexible material.

According to one aspect of the application, wherein the liquid crystal panel comprises a display area and a non-display area, the non-display area is disposed on a circumference side of the display area, and the plurality of first threaded holes are disposed in the non-display area.

According to one aspect of the application, wherein the backlight module comprises a light emitting unit and a supporting unit, the supporting unit is fixed on a circumference side of the light emitting unit, and the plurality of second threaded holes are disposed in the supporting unit.

According to one aspect of the application, wherein the liquid crystal display further comprises a plurality of detecting devices disposed corresponding to the plurality of threaded holes, when the connecting screws are fixedly coupled with the plurality of threaded holes, a detecting circuit of each detecting device is located between the connecting screw and the threaded hole corresponding to the detecting device.

According to one aspect of the application, wherein the plurality of detecting devices comprise a detecting circuit, a signal collecting unit, and a determining circuit, wherein the detecting circuit comprises a Wheatstone bridge, and resistances constituting the Wheatstone bridge are varistors.

According to one aspect of the application, wherein the signal collecting unit comprises:

a current detecting module configured to collect a current output by the Wheatstone bridge;

a voltage detecting module configured to collect a voltage output by the Wheatstone bridge.

According to one aspect of the application, wherein the determining circuit determines a fixed state of the liquid crystal display according to an electric signal collected by the signal collecting unit;

when a current signal collected by the current detecting module is equal to a threshold current signal and a voltage signal collected by the voltage detecting module is 0, the determining circuit determines that the display panel and the backlight module of the liquid crystal display are fixed;

wherein the threshold current signal is the current output by the Wheatstone bridge when the display panel of the liquid crystal display and the backlight module are fixed.

Beneficial Effects

The present application adopts a screw structure as a fixing member between a display panel and a backlight module of a liquid crystal display, instead of the light-shielding tape in the prior art. On one hand, the present application prevents a risk of the display panel and the backlight module from falling off due to the decline in bonding ability with the increase of usage time, and improves the reliability of the liquid crystal display. On the other hand, because an area of the screw structure is significantly less than an area of the adhesive tape, the technical solution of the present application can significantly reduce the fixing cost between the display panel and the backlight module.

DETAILED DESCRIPTION OF PREFERRED EMBODIMENTS

Figure 1:
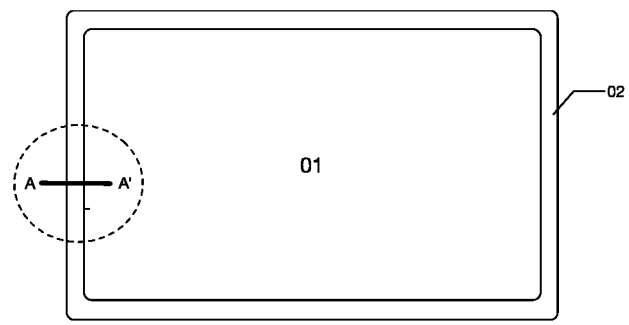
FIG. 1 is a top plan view of a display panel in a liquid crystal display in the prior art.

Description of following embodiment, with reference to accompanying drawings, is used to exemplify specific embodiments which may be carried out in the present disclosure. Directional terms mentioned in the present disclosure, such as "top", "bottom", "front", "back", "left", "right", "inside", "outside", "side", etc., are only used with reference to orientation of the accompanying drawings. Therefore, the directional terms are intended to illustrate, but not to limit, the present disclosure. In the drawings, components having similar structures are denoted by same numerals.

Figure 2:
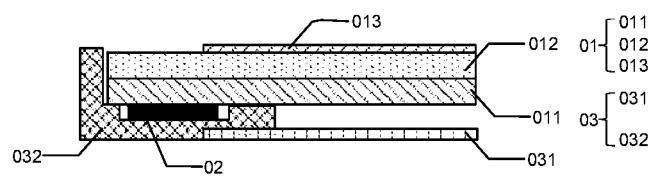
FIG. 2 is a cross-sectional view of the liquid crystal display panel of FIG. 1 taken along an AA' direction.

First, the prior art will be briefly described. Referring to FIG. 1 and FIG. 2, FIG. 1 is a plan view of a display panel in a liquid crystal display panel of the prior art, and FIG. 2 is a cross-sectional view of the liquid crystal display panel of FIG. 1 taken along a AA' direction. In the prior art, a display panel 01 is fixed to a backlight module 03 by an adhesive tape 02. Referring to FIG. 2, the display panel includes a control circuit 011, a light emitting structure 012, and a protective film 013. The backlight module 03 includes a light emitting unit 031 and a supporting unit 032. The support unit 032 is fixed to a peripheral side of the light emitting unit 031. The support unit 032 has a groove on a surface on which the display panel 01 is attached, and the adhesive tape 02 is disposed in the groove.

Referring to FIG. 1 and FIG. 2, in the prior art, the light shielding tape needs to cover all frames of the display panel, and the cost is relatively high. In addition, with a number of usages increasing and temperatures rising, a viscosity of acrylic adhesive decreases, resulting in a decrease in the adhesive ability of the light-shielding tape, which pose a risk of the display panel and the backlight module separating.

Therefore, the present application provides a liquid crystal display to optimize the backlight module of the display screen and the fixing method of the display panel.

Referring to FIG. 4 to FIG. 8, the present application provides a liquid crystal display including a display panel 10, a backlight module 30, a plurality of connection screws 42, a flexible circuit board 50, and a control chip 60.

Figure 3:
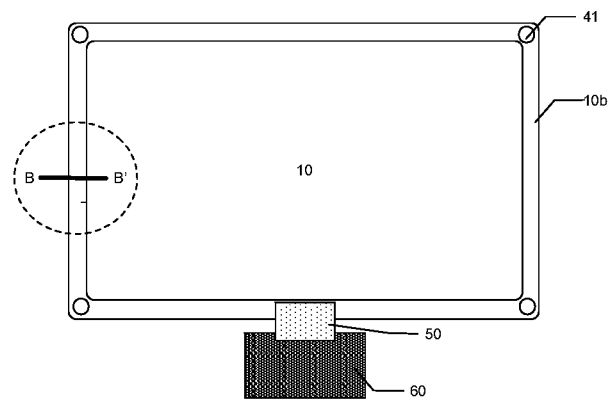
FIG. 3 is a structural diagram of a liquid crystal display panel in an embodiment of the present application.
Figure 4:
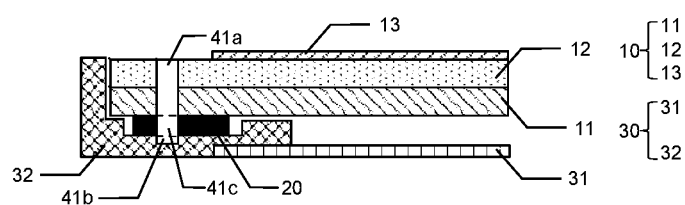
FIG. 4 is a cross-sectional view of the liquid crystal display panel of FIG. 3 taken along a BB' direction.

Referring to FIG. 3 and FIG. 4, FIG. 3 is a structural diagram of a liquid crystal display panel according to an embodiment of the present application, and FIG. 4 is a cross-sectional view of the liquid crystal display panel of FIG. 3 taken along a BB' direction. The display panel 10 includes a display area and a non-display area 10b surrounding the display area. The display panel 10 and the backlight module 30 have a plurality of correspondingly disposed threaded holes 41, the plurality of connecting screws 42 cooperate with the plurality of threaded holes 41 to fix the display panel 10 and the backlight module 30 together.

In the present application, the liquid crystal display further includes a buffer pad 20 between the liquid crystal panel and the backlight module 30. Specifically, the surface of the backlight module 30 that is in contact with the display panel 10 has a groove, and the buffer pad 20 is disposed in the groove. In the present embodiment, the buffer pad 20 is made of a flexible material in order to prevent cracking of the panel caused by an excessive pressure applied to the display panel when the screws 42 are mounted. A thickness of the buffer pad 20 is slightly greater than a thickness of the groove, for example, the thickness of the buffer pad 20 is 1.5 to 2 times the thickness of the groove.

In the present application, each threaded hole 41 includes a first threaded hole 41a, a second threaded hole 41b, and a third threaded hole 41c. The first threaded hole 41a is disposed on the display panel 10, specifically, on the non-display area 10b of the display panel 10. The second threaded hole 41b is disposed on the backlight structure. The third threaded hole 41c is provided on the buffer pad 20. When the display panel 10 and the backlight module 30 are combined, the first threaded hole 41a, the second threaded hole 41b, and the third threaded hole 41c overlap.

Referring to FIG. 4, the display panel 10 includes a control circuit 11, a light emitting structure 12, and a protective film 13, which are stacked. The backlight module 30 includes a light emitting unit 31 and a supporting unit 32. The supporting unit 32 is fixed to a circumferential side of the light emitting unit 31, and the plurality of second threaded holes 41b are disposed on the supporting unit 32.

Figure 5:
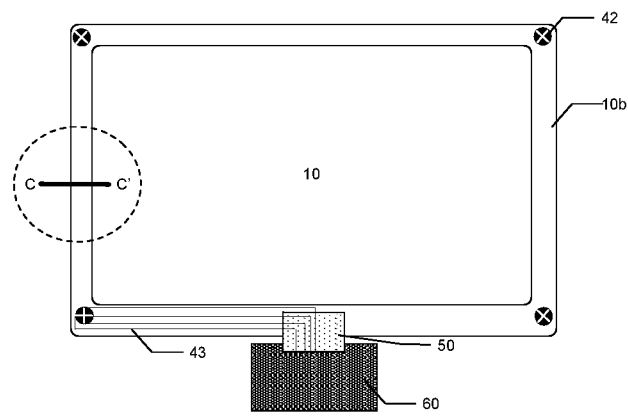
FIG. 5 is a top plan view of the liquid crystal display panel of FIG. 3 after a backlight module is fixed.
Figure 6:
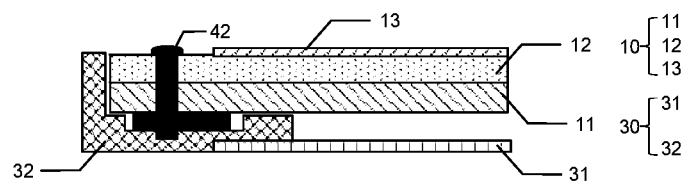
FIG. 6 is a cross-sectional view of the liquid crystal display panel of FIG. 5 taken along a CC' direction.

Referring to FIGS. 5 and 6, the display panel 10 and the backlight module 30 are fixed together by threaded holes 41 and screws 42. The thread structure is not easily affected by external environment due to its strong fixing ability, so its stability is good. Moreover, a fixing area occupied by the thread structure is also small, so the present invention significantly optimizes the fixing method of the display panel 10 and the backlight module 30.

In the present application, in order to prevent the display panel from cracking due to excessive pressure applied to the display panel when the screws 42 are mounted, as well as prevent the screw 42 from being skewed or offset in the installation process, at least one detecting device is required for real time monitoring of the pressure around the first threaded hole 41a during the installation of the screw 42. The plurality of detecting devices are disposed corresponding to the plurality of threaded holes 41. When the connecting screws 42 are fixedly coupled to the plurality of threaded holes 41, a detecting circuit of each of the detecting devices is located between the connecting screws 42 and the threaded holes 41 corresponding to the detecting devices.

Figure 7:
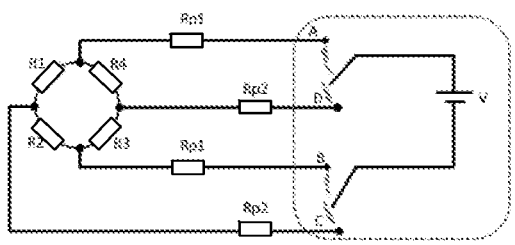
FIG. 7 is a circuit diagram of a detecting device of the liquid crystal display panel of FIG. 5.
Figure 8:
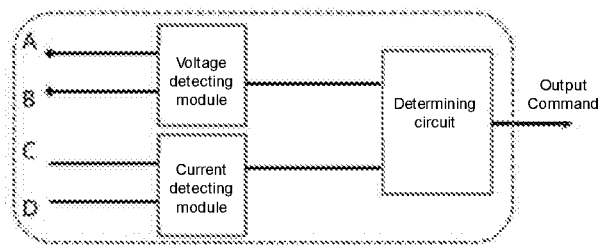
FIG. 8 is a structural diagram of the detecting device of FIG. 7

Referring to FIG. 5, FIG. 7, and FIG. 8, the detecting devices include the detecting circuit, a signal collecting unit, and a determining circuit. In this embodiment, the detecting circuit includes a Wheatstone bridge, and a resistance forming the Wheatstone bridge is a varistor. The Wheatstone bridge consisting of the varistor can accurately detect pressure between the connecting screws 42 and the threaded holes 41, and convert the pressure into a different electrical signal according to a magnitude of the pressure.

Referring to FIG. 7, in this embodiment, the detecting circuit includes a first varistor R1, a second varistor R2, a third varistor R3, and a fourth varistor R4. The first varistor R1, the second varistor R2, the third varistor R3, and the fourth varistor R4 are connected in series to form the Wheatstone bridge. Four nodes of the Wheatstone circuit are first node A, second node B, third node C, and fourth node D, respectively. A first resistor Rp1 is disposed between the first node A and the Wheatstone bridge. Another first resistor Rp1 is disposed between the second node B and the Wheatstone bridge. A second resistor Rp2 is disposed between the third node C and the Wheatstone bridge. Another second resistor Rp2 is disposed between the fourth node D and the Wheatstone bridge.

The signal collection unit includes a current detecting module and a voltage detecting module. The current detecting module is configured to collect a current output by the Wheatstone bridge. The voltage detecting module is configured to collect a voltage output by the Wheatstone bridge.

The determining circuit determines a fixed state of the liquid crystal display according to an electric signal collected by the signal collecting unit. When a current signal collected by the current detecting module is equal to a threshold current signal and a voltage signal collected by the voltage detecting module is 0, the determining circuit determines that the display panel 10 and the backlight module 30 of the liquid crystal display are fixed. The threshold current signal is the current output by the Wheatstone bridge when the display panel of the liquid crystal display 10 and the backlight module 30 are fixed.

For example, in this embodiment, referring to FIG. 7, when a power V is applied across the third node C and the fourth node D, the voltage detecting module detects that a voltage difference between the first node A and the second node B is zero; and when the power V is applied across the first node A and the second node B, the voltage detecting module detects that a voltage difference between the third node C and the fourth node D is zero. It is indicated that the varistors around the threaded holes 41 are balanced by force, and the screws 42 are aligned accurately. At this time, the circuit outputs a command to tighten the screws 42 continuously.

Meanwhile, when the power V is applied across the third node C and the fourth node D, the current detecting module detects the current passing through the second resistor Rp2. If the detected current is equal to the threshold current set by the system, the screw 42 are fully tightened. At this point, the circuit outputs a command to stop tightening the screws.

Likewise, when the power V is applied across the third node C and the fourth node D, the voltage detecting module detects that a voltage difference between the first node A and the second node B is not zero, and when the power V is applied across the first node A and the second node B, the voltage detecting module detects that a voltage difference between the third node C and the fourth node D is not zero. It is indicated that the varistors around the threaded holes 41 are not balanced by force, and the screws 42 are not aligned accurately. At this time, the circuit outputs a command to loosen the screws until the screws are aligned.

Meanwhile, when the power V is applied across the third node C and the fourth node D, the current detecting module detects the current passing through the second resistor Rp2. If the detected current is greater than the threshold current set by the system, the screw 42 are not fully tightened. At this point, the circuit outputs a command to tighten the screws. If the detected current is less than the threshold current set by the system, the screw 42 are too tight. At this point, the circuit outputs a command to quickly loosen the screws to prevent excessive pressure at the threaded holes from crushing the display panel.

The present application adopts a screw structure as a fixing member between a display panel and a backlight module of a liquid crystal display, instead of the light-shielding tape in the prior art. On one hand, the present application prevents a risk of the display panel and the backlight module from falling off due to the decline in bonding ability with the increase of usage time, and improves the reliability of the liquid crystal display. On the other hand, because an area of the screw structure is significantly less than an area of the adhesive tape, the technical solution of the present application can significantly reduce the fixing cost between the display panel and the backlight module.

As is understood by persons skilled in the art, the foregoing preferred embodiments of the present disclosure are illustrative rather than limiting of the present disclosure. It is intended that they cover various modifications and that similar arrangements be included in the spirit and scope of the present disclosure, the scope of which should be accorded the broadest interpretation so as to encompass all such modifications and similar structures.

What is claimed is:

1. A liquid crystal display comprising a display panel, a backlight module, and a plurality of connecting screws;
   wherein the display panel and the backlight module have a plurality of threaded holes correspondingly arranged, and the plurality of connecting screws cooperate with the plurality of threaded holes to fix the display panel and the backlight module together;
   the liquid crystal display further comprises a plurality of detecting devices disposed correspondingly to the plurality of threaded holes, each of the detecting devices comprises a detecting circuit, a signal collecting unit, and a determining circuit, and the signal collecting unit comprises a current detecting module configured to collect a current output by a Wheatstone bridge of the detecting circuit and a voltage detecting module configured to collect a voltage output by the Wheatstone bridge; and
   wherein in response to the current collected being greater than a threshold current set by the detecting devices, the determining circuit outputs a first command to tighten the connecting screws, and in response to the current collected being less than the threshold current set by the detecting devices, the determining circuit outputs a second command to loosen the connecting screws.

2. The liquid crystal display according to claim 1, wherein each of the threaded holes comprises:
   a first threaded hole defined on the display panel; and
   a second threaded hole defined on the backlight structure;
   wherein the first threaded hole and the second threaded hole overlap when the display panel and the backlight module are combined.

3. The liquid crystal display according to claim 2, wherein the liquid crystal display further comprises a buffer pad located between the display panel and the backlight module;
   each of the threaded holes further comprises a third threaded hole disposed on the buffer pad; and
   the first threaded hole, the second threaded hole, and the third threaded hole overlap when the display panel and the backlight module are combined.

4. The liquid crystal display according to claim 3, wherein a material forming the buffer pad is a flexible material.

5. The liquid crystal display according to claim 2, wherein the display panel comprises a display area and a non-display area, the non-display area is defined on a circumference side of the display area, and a plurality of first threaded holes are defined in the non-display area.

6. The liquid crystal display according to claim 2, wherein the backlight module comprises a light emitting unit and a supporting unit, the supporting unit is fixed on a circumference side of the light emitting unit, and a plurality of second threaded holes are defined in the supporting unit.

7. The liquid crystal display according to claim 1, wherein the connecting screws are fixedly coupled with the plurality of threaded holes, a detecting circuit of each of the detecting devices is located between the connecting screws and the threaded holes corresponding to each of the detecting devices.

8. The liquid crystal display according to claim 7, wherein resistors constituting the Wheatstone bridge are varistors.

9. The liquid crystal display according to claim 1, wherein the determining circuit determines a fixed state of the liquid crystal display according to an electric signal collected by the signal collecting unit; wherein in response to the current collected by the current detecting module being equal to the threshold current and the voltage collected by the voltage detecting module being 0, the determining circuit determines that the display panel and the backlight module of the liquid crystal display are fixed; and wherein the threshold current is the current output by the Wheatstone bridge when the display panel of the liquid crystal display and the backlight module are fixed.

* * * * *